United States Patent
Mittricker

(10) Patent No.: US 7,059,134 B2
(45) Date of Patent: Jun. 13, 2006

(54) GAS SEAL APPARATUS AND METHOD FOR USE IN COGENERATION APPLICATIONS

(75) Inventor: Frank F. Mittricker, Jamul, CA (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/408,854

(22) Filed: Apr. 8, 2003

(65) Prior Publication Data
US 2004/0200225 A1    Oct. 14, 2004

(51) Int. Cl.
*F02C 6/18* (2006.01)
(52) U.S. Cl. .................... 60/772; 60/39.182
(58) Field of Classification Search ............ 60/39.182, 60/772, 773; 122/7 R, 7 B
See application file for complete search history.

(56) References Cited

U.S. PATENT DOCUMENTS

| | | | | |
|---|---|---|---|---|
| 3,118,429 A | * | 1/1964 | Hochmuth | 60/39.182 |
| 3,164,958 A | * | 1/1965 | Pacault | 60/39.182 |
| 4,113,005 A | * | 9/1978 | Cantrell, Jr. | 60/39.182 |
| 4,332,546 A | * | 6/1982 | Bacsik | 122/7 R |
| 5,461,853 A | * | 10/1995 | Vetterick | 60/39.182 |
| 5,473,884 A | * | 12/1995 | Sutton et al. | 60/39.182 |
| 5,493,854 A | * | 2/1996 | Nielsen | 60/39.182 |
| 5,558,047 A | * | 9/1996 | Vetterick | 122/367.1 |
| 5,626,103 A | | 5/1997 | Haws et al. | |
| 5,713,195 A | * | 2/1998 | Bronicki et al. | 60/39.182 |

FOREIGN PATENT DOCUMENTS

| | | |
|---|---|---|
| DE | 15 26 896 | 6/1970 |
| DE | 100 32 625 | 8/2001 |
| EP | 0 967 366 | 12/1999 |
| WO | WO 02/04795 | 1/2002 |

OTHER PUBLICATIONS

DE 100 32 625, Christian Meyer, "Method and Devise For Simultaneously Producing Heat and Hot Gas By Cogeneration of Power and Heat", Aug. 2, 2001, Abstract.
European Search Report dated Oct. 24, 2003, European Patent Office, The Hague, pp. 1-4.

* cited by examiner

*Primary Examiner*—Ted Kim

(57) ABSTRACT

A cogeneration system having a gas turbine generator (10) that provides combustion air via an exhaust to a heat recovery steam generator (13) has a gas-seal stack (19) coupled there between. The gas-seal stack (19) prevents substantial portions of the exhaust gas from exiting there through due to formation of a column of higher density ambient air. This blockage is achieved without resort to mechanical. pneumatic pathway control devices. Conversely, if and when the gas turbine generator (10) shuts down, ambient air is drawn through the gas-seal stack (19) and serves to support continued combustion in the heat recovery steam generator (13). In one embodiment, an induction fan (or fans) (16) is located at the exhaust of the heat recovery steam generator (13) such that combustion air is pulled through the heat recovery steam generator (13) rather than pushed there through. This aids in minimizing backpressure at the exhaust of the gas turbine generator (10).

15 Claims, 1 Drawing Sheet

US 7,059,134 B2

GAS SEAL APPARATUS AND METHOD FOR USE IN COGENERATION APPLICATIONS

TECHNICAL FIELD

This invention relates generally to cogeneration systems and more particularly to heat recovery steam generators as coupled to gas turbine generators.

BACKGROUND

Cogeneration systems are known in the art. In one form of cogeneration, the exhaust of a gas turbine generator is coupled through a transition piece to a heat recovery steam generator. During normal use, induction fans push heated exhaust air (including oxygen) from the gas turbine generator through the heat recovery steam generator. The heat recovery steam generator uses the warmed oxygen in this hot air for combustion purposes.

From time to time, either for scheduled maintenance purposes or through unexpected incident, the gas turbine generator will shut down. When this occurs, combustion air no longer flows from the exhaust to serve the needs of the heat recovery steam generator. Denial of combustion air, even for a relatively brief period of time, can cause a corresponding shut down of the heat recovery steam generator system. Unfortunately, once shut down, it can be a very time (and manpower) intensive activity to bring the heat recovery steam generator system back on-line (twelve to twenty-four hours of cycletime is not uncommon). Such cascading events and consequences render even a momentary shutdown of the gas turbine generator a serious problem.

One prior art solution has been to couple an auxiliary source of combustion-supporting air to the input of the heat recovery steam generator. During ordinary use, louvers (typically of the guillotine variety) are maintained in a closed position to prevent air from moving through the auxiliary opening and into the heat recovery steam generator. When a shutdown of the gas turbine generator is sensed, the louver is opened and the induction fans at the front end of the heat recovery steam generator push air from the auxiliary source into the heat recovery steam generator.

Unfortunately, such a solution has not been suitably reliable. Though shutdown of the gas turbine generator can and will occur from time to time, considerable time can elapse between such events. During that time, corrosion and/or mechanical incidents can occur that stymie free movement of the louver. This, in turn, can prevent the louver from properly opening when needed. When the louver cannot open properly, the heat recovery steam generator is again denied combustion air and system shutdown can again occur.

At least one other notable design concern exists. The induction fan(s) described above tends to create a relatively high pressure area in the transition piece between the exhaust of the gas turbine generator and the combustion air input of the heat recovery steam generator (10 to 14 inches of water are ordinary pressures in this regard). This pressure in the transition piece serves well to push combustion air into the heat recovery steam generator as desired, but also serves to create a backpressure on the exhaust of the gas turbine generator. The gas turbine generator is powerful enough to overcome such pressure, but efficiency of the gas turbine generator is still nevertheless somewhat impaired by this approach. Typical prior art solutions to the gas turbine generator shutdown problem noted above do little or nothing to mitigate this additional concern.

BRIEF DESCRIPTION OF THE DRAWINGS

The above needs are at least partially met through provision of the gas seal apparatus and method for use in cogeneration applications described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a transition piece as coupled between the exhaust of a gas turbine generator and a heat recovery steam generator is further coupled to a gas-seal stack that presents a gas seal during normal operation of the corresponding cogeneration system. During normal use, the gas seal prevents exhaust gases from the gas turbine generator from escaping through the stack, thereby keeping such gases available as intended for use by the heat recovery steam generator. When the gas turbine generator shuts down for whatever reason, however, combustion air (from the local environment in a preferred embodiment) can be inwardly drawn through the gas-seal stack and into the heat recovery steam generator. No louvers are necessary to effect such operation thereby rendering this functionality quite reliable.

In one embodiment, the gas-seal stack is formed in the shape of a letter "J." In another embodiment, two gas-seal stacks can be utilized (therefore appearing somewhat in the shape of the letter "U"). Additional gas-seal stacks can be utilized as well to increase the available quantity of combustion air.

In one embodiment, no induction fans are located in the transition piece that couples between the gas turbine generator and the gas-seal stack. Instead, induction fans are located at the exhaust of the heat recovery steam generator. So configured, the induction fans pull combustion air through the heat recovery steam generator rather than pushing combustion air therethrough. Such an orientation is relatively neutral with respect to the heat recovery steam generator. Efficient operation of the gas turbine generator, however, is improved via this approach. In particular, instead of a relatively high pressure being maintained in the transition piece at the exhaust of the gas turbine generator, a relatively low pressure results (on the order of one or two inches of water). This reduced pressure translates directly as a reduced backpressure on the gas turbine generator. As a result, the gas turbine generator operates more efficiently. This increased efficiency can itself correspond to enough additional incremental power to operate the induction fans for the heat recovery steam generator.

Figure 1:
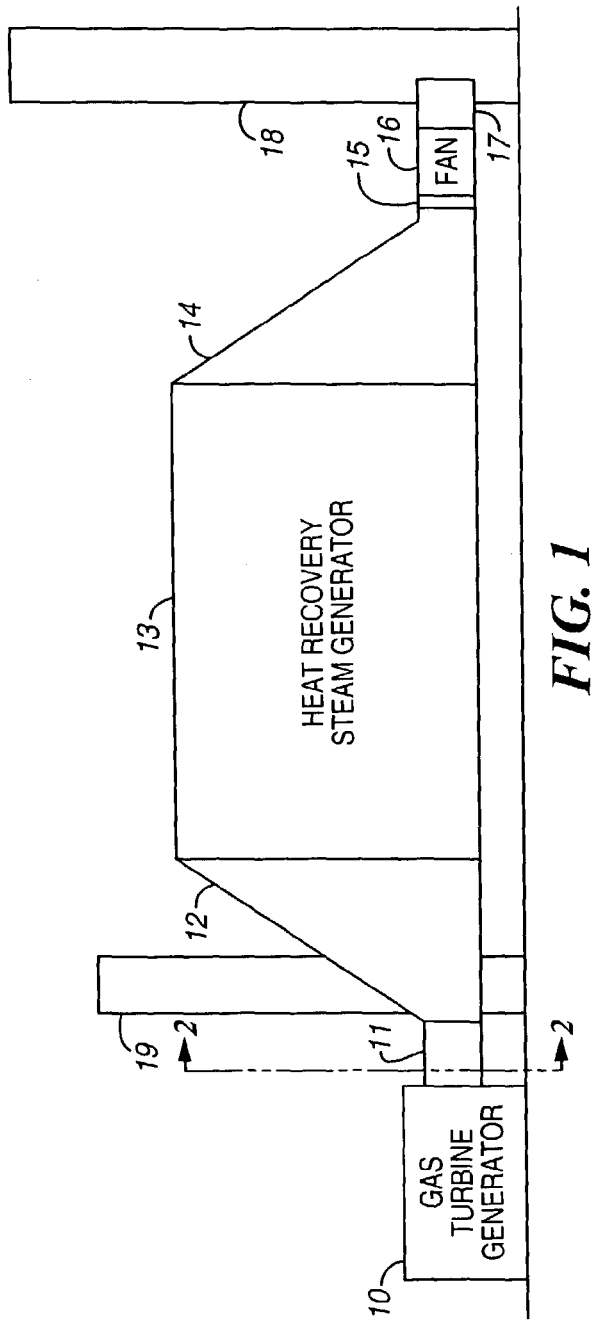
FIG. 1 comprises a side elevational schematic of a cogeneration system as configured in accordance with an embodiment of the invention.

Referring now to FIG. 1, pursuant to a first embodiment, the exhaust of a gas turbine generator 10 couples via an expansion joint 11 to a transition piece 12 which in turn couples to the combustion air input of a heat recovery steam generator 13. The expansion joint 11 and the transition piece 12 essentially comprise pneumatic pathways through which exhaust gases from the gas turbine generator 10 can pass to the input of the heat recovery steam generator 13.

The output of the heat recovery steam generator 13 couples via another transition piece 14 to an exhaust stack 18 through a guide vane 15, one or more induction fans 16, and a pneumatic coupling 17. In this particular embodiment, two induction fans can be accommodated in a side-by-side configuration, with the pneumatic coupling 17 providing a passageway from each induction fan to the stack 18.

All of the above elements can be provided through use of existing prior art components and are otherwise well understood in the art. Therefore, for the sake of brevity and preservation of focus, additional detailed description of these individual items will not be provided here.

So configured, gases are substantially pulled through the heat recovery steam generator 13 by the induction fan(s) 16 as located at the output thereof. In this embodiment, there are no induction fans in the input transition piece 12. As a result, air pressure in this transition piece 12 is relatively low (typically 1 to 2 inches of water) when the exhaust-situated induction fan(s) 16 is properly selected and operated with respect to the other constituent elements of the overall pneumatic pathway. This reduction in air pressure (as compared to typical prior art practice) in turn results in reduced back pressure on the gas turbine generator 10 and fosters more efficient operation thereof.

Figure 2:
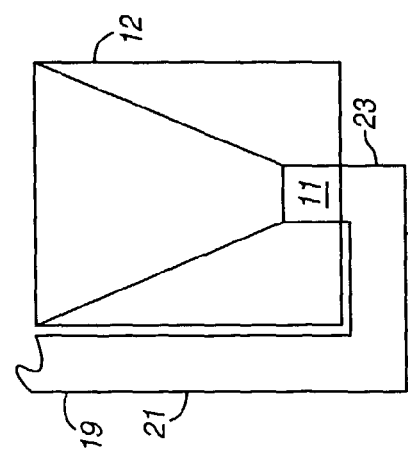
FIG. 2 comprises front elevational detail view of a transition piece and gas-seal stack as configured in accordance with an embodiment of the invention.

In this embodiment, the front-end transition piece 12 also couples to a gas-seal stack 19 comprising, in one preferred embodiment, a J-shaped stack. As perhaps better viewed in FIG. 2, this stack 19 has a stack portion 21 that couples via an intermediary pneumatic pathway 22 to an upwardly oriented vertical section 23. The latter in turn, in this embodiment, pneumatically couples to the underside of the transition piece 12. The stack portion 21 should be of sufficient length and height to support retention of enough atmospheric gas to thereby constitute a gas seal that substantially inhibits movement of exhaust gases from the exhaust of the gas turbine generator 10 through the gas-seal stack 19. The diameter of the gas-seal stack 19 should be of sufficient size to allow for passage of enough atmospheric gas as will support desired combustion in the heat recovery steam generator 13. In a preferred embodiment, the diameter of the gas-seal stack 19 will not greatly exceed the minimum necessary diameter in order to thereby also allow for relative minimization of the height of the gas-seal stack 19. Where height of the stack is of less concern, limitations regarding the size of the diameter of course become less important.

So configured, the weight of the gases in the air-seal stack 19 are sufficient to effectively block passage of the warmer gases that exit the gas turbine generator 10 exhaust. This blockage occurs without need for mechanical blockage as is ordinarily achieved with louvers and the like. In fact, in these embodiments, there are no louvers in the transition piece 12 or otherwise associated with the gas-seal stack 19. Instead, the gas-seal stack 19 serves to form a column of ambient air having a greater density, at least on average, than the exhaust from the gas turbine generator 10. This column of ambient air serves, during ordinary operation, to prevent substantial portions of the gas turbine generator exhaust from exiting through the stack. Conversely, when the gas turbine generator 10 shuts down for whatever reason, ambient combustion air can be drawn through the gas-seal stack 19 and into the heat recovery steam generator 13 by the continued action of the induction fan(s) 16 located at the output thereof. As a result, the heat recovery steam generator 13 can continue to generate steam without substantial interruption regardless of whether the gas turbine generator 10 is operating and regardless of the duration of any interruption to the gas turbine generator 10. These desired results occur without need for any mechanical means or intervention.

Figure 3:
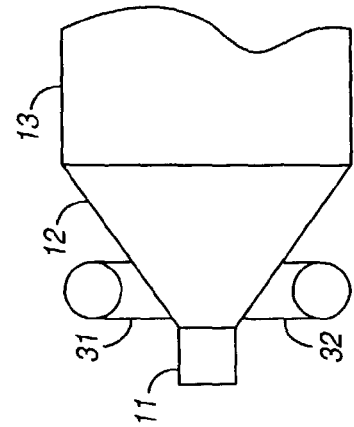
FIG. 3 comprises a top plan detail view of a transition piece and gas-seal stack as configured in accordance with another embodiment of the invention.

As configured in this embodiment, a single J-shaped gas-seal stack 19 is coupled to the transition piece 12. If desired, additional gas-seal stacks can be coupled as well. For example, with reference to FIG. 3, two opposing J-shaped gas-seal stacks 31 and 32 can both be coupled as described above (thereby giving rise to a configuration bearing some resemblance to the letter "U" when viewed as a whole). In this fashion, additional combustion air can be made available without necessitating a taller gas-seal stack.

Other configurations are of course possible. Various gas-seal stack shapes, for example, can be utilized to meet various needs or to accommodate specific requirements of a given installation.

Various benefits derive from the embodiments set forth above. In particular, a heat recovery steam generator can be assured a constant supply of combustion air without concern for potential mechanical failure of pneumatic pathway control elements (such as louvers). Further, back pressure on the gas turbine generator is significantly reduced, potentially to the point where at least the cost of operating the induction fan or fans can be covered by the increased output efficiency.

Those skilled in the art will recognize that a wide variety of other modifications, alterations, and combinations can be made with respect to the above described embodiments without departing from the spirit and scope of the invention, and that such modifications, alterations, and combinations are to be viewed as being within the ambit of the inventive concept.

I claim:

1. A method of providing combustion oxygen to a heat recovery steam generator comprising a part of a cogeneration application, comprising:

providing a transition piece with increasing cross sectional area between a gas turbine exhaust outlet of a gas turbine generator and a combustion oxygen input for the heat recovery steam generator;

providing a gas seal pneumatically coupled to the transition piece;

providing at least one induction fan at an output of the heat recovery steam generator to relieve high back pressure on the gas turbine generator such that combustion oxygen is pulled through the heat recovery steam generator rather than pushed therethrough;

when the gas turbine generator is providing gas turbine exhaust, using the gas seal to provide combustion oxygen from the gas turbine exhaust to the heat recovery steam generator to prevent substantial portions of the gas turbine exhaust from exiting through the gas seal; and when the gas turbine generator is not providing the gas turbine exhaust, providing combustion oxygen through the gas seal to the heat recovery steam generator; and generating steam by combustion in the heat recovery steam generator with combustion oxygen from the gas turbine exhaust or from combustion oxygen through the gas seal.

2. The method of claim 1 wherein the gas seal is pneumatically coupled to the transition piece on an underside portion of the transition piece.

3. The method of claim 2 wherein providing a gas seal includes coupling a J-shaped stack to the transition piece.

4. The method of claim 1 wherein providing a gas seal includes providing a plurality of air seal stacks that are pneumatically coupled to the transition piece and when the gas turbine generator is not providing gas turbine exhaust, providing combustion oxygen through said plurality of air seal stacks.

5. The method of claim 1 further comprising providing at least one guide vane disposed proximal to the at least one induction fan.

6. The method of claim 1 wherein when the gas turbine generator ceases providing the gas turbine exhaust, providing the combustion oxygen through the gas seal to the heat recovery steam generator without interruption to the operation of the heat recovery steam generator.

7. Apparatus for use in a cogeneration application having a gas turbine generator which gas turbine generator provides both power and gas turbine exhaust, and a heat recovery steam generator that generates steam by the combustion of gas turbine exhaust, the apparatus comprising:

transition piece means with increasing cross sectional area disposed between an exhaust output of the gas turbine generator and an input to the heat recovery steam generator for feeding gas turbine exhaust from the gas turbine generator to the heat recovery steam generator for combustion, wherein the transition piece means has gas seal stack means pneumatically coupled thereto;

induction means disposed at an output of the heat recovery steam generator for relieving high back pressure on the gas turbine generator wherein;

in a first mode of operation, when the gas turbine generator is providing gas turbine exhaust for combustion, providing a gas seal that substantially prevents any gas turbine exhaust from exiting through the gas seal stack means; and in a second mode of operation, when the gas turbine generator is not providing gas turbine exhaust, providing ambient air for combustion through the gas seal stack means to the input of the heat recovery steam generator;

such that the heat recovery steam generator continues to generate steam without substantial interruption when the gas turbine generator is not operating.

8. The apparatus of claim 7 wherein the gas seal stack means pneumatically couples to an underside of the transition piece means.

9. The apparatus of claim 8 wherein the gas seal stack means includes a J-shaped stack.

10. The apparatus of claim 7 wherein the gas seal stack means includes a plurality of stacks.

11. The apparatus of claim 10 wherein the plurality of stacks are each pneumatically coupled at least partially to an underside of the transition piece means.

12. The apparatus of claim 10 wherein the plurality of stacks includes at least one stack that is J-shaped.

13. The apparatus of claim 12 wherein each of the plurality of stacks is comprised of a J-shaped stack.

14. The apparatus of claim 7 wherein the induction means includes at least one fan.

15. The apparatus of claim 14 wherein the induction means further includes at least one guide vane disposed proximal to the at least one fan.

\* \* \* \* \*